US006540307B1

(12) United States Patent
Ward et al.

(10) Patent No.: US 6,540,307 B1
(45) Date of Patent: Apr. 1, 2003

(54) EMERGENCY BRAKE SYSTEM USING A LOAD-RESPONSIVE APPORTIONING VALVE

(75) Inventors: Andrew John Ward, Birmingham (GB); David Charles Hurst, Solihull (GB)

(73) Assignee: Lucas Industries PLC, Solihull (GB)

( * ) Notice: Subject to any disclaimer, the term of this patent is extended or adjusted under 35 U.S.C. 154(b) by 206 days.

(21) Appl. No.: 08/952,673

(22) PCT Filed: May 31, 1996

(86) PCT No.: PCT/GB96/01284

§ 371 (c)(1), (2), (4) Date: Jan. 9, 1998

(87) PCT Pub. No.: WO96/38328

PCT Pub. Date: Dec. 5, 1996

(30) Foreign Application Priority Data

Jun. 2, 1995 (GB) ............................................ 9511136

(51) Int. Cl.[7] ............................................ B60T 13/74

(52) U.S. Cl. ............................ 303/3; 303/9; 303/9.69; 303/22.8

(58) Field of Search ............................. 303/9.62, 9.63, 303/9.69, 15, 113.5, 123, 124, 22.5, 22.6, 22.7, 3, 9, 22.1, 22.2, 22.8, 22.4

(56) References Cited

U.S. PATENT DOCUMENTS

| | | | | |
|---|---|---|---|---|
| 3,162,491 A | * 12/1964 | Winsen | 303/9.74 |
| 4,053,186 A | * 10/1977 | Jakobi | 303/22 R |
| 4,159,853 A | * 7/1979 | Oberthuer et al. | 303/9.63 |
| 4,180,295 A | * 12/1979 | Takeshita et al. | 303/9.71 |
| 4,265,489 A | * 5/1981 | Meinicke | 303/3 |
| 4,302,058 A | * 11/1981 | Nagase et al. | 303/22.5 |
| 4,553,773 A | * 11/1985 | Pierce | 137/627.5 |
| 4,585,279 A | * 4/1986 | Doto | 303/9.69 |
| 5,147,114 A | * 9/1992 | Hommen et al. | 303/15 |
| 5,427,440 A | * 6/1995 | Ward et al. | 303/3 |

FOREIGN PATENT DOCUMENTS

| | | | |
|---|---|---|---|
| DE | 38 43 208 | * 6/1990 | |
| DE | 40 22 481 | * 10/1991 | |
| EP | 0 438 678 | * 7/1991 | |
| EP | 0 527 005 | * 2/1993 | |
| GB | 2 235 505 | * 3/1991 | |
| WO | 92/13740 | * 8/1992 | 303/3 |

* cited by examiner

*Primary Examiner*—Jack Lavinder
*Assistant Examiner*—Thomas J. Williams
(74) *Attorney, Agent, or Firm*—Oblon, Spivak, McClelland, Maier & Neustadt, P.C.

(57) ABSTRACT

A rear axle braking system for a vehicle has a primary electronic braking circuit supplied with a source of primary braking pressure and a mechanical back-up braking circuit supplied with a source of back-up braking pressure. The braking actuator receives braking pressure and thereby brakes a wheel on a vehicle axle. During braking, a changeover valve is normally actuated to apply the primary braking pressure to the braking actuator. In the event of an electronic system failure, the changeover valve is not applied and instead the source of back-up braking pressure is supplied to the actuator. A regulating valve is located in the back-up braking circuit between the source and the changeover valve and is operable as a function of axle loading and back-up brake pressure to control the supply of back-up braking pressure to the changeover valve. The application of additional braking pressure to a wheel can be limited if the loading on the axle is likely to result in vehicle instability when braking.

19 Claims, 8 Drawing Sheets

EMERGENCY BRAKE SYSTEM USING A LOAD-RESPONSIVE APPORTIONING VALVE

BACKGROUND OF THE INVENTION

1. Field of the Invention

The present invention relates to vehicle braking systems, and in particular to electronic braking systems (EBS) which have a back-up braking facility. The invention is particularly suited to rear axle braking systems for a wide range of vehicles including trailers.

2. Discussion of the Background

With the introduction of electronic braking systems, there has arisen a need for a pneumatic backup system. The introduction of electronic control of the braking pressure in conjunction with the introduction of electrical measurement of axle load by suspension height and/or air suspension pressure has led to the removal of rear axle load valves. This A results in the situation that under failed conditions of the electronic braking system, such that the pneumatic back-up system is in operation, there is no load apportioning of the pressure to the rear brakes, which can lead to vehicle instability under braking at lower vehicle loads.

Existing braking systems (e.g. Great Britain Patent No. 2235505) use a load apportioning valve that is connected with a mechanical link to the axle in order to provide a load regulating input to the valve. The valve is positioned between the braking source and the brake actuator.

SUMMARY OF THE INVENTION

It is an object of the present invention to provide a simple method of incorporating load apportioning into the braking system only when back-up braking is required.

In accordance with the present invention, a braking system for a vehicle comprises a primary electronic braking circuit;

- a back-up braking circuit having a source of back-up braking pressure;
- a braking actuator for braking a wheel on a vehicle axle; and
- a changeover valve which selectively applies one of the primary and back-up braking pressures to the braking actuator during braking;
- characterised by a regulating valve located in the back-up braking circuit between the source of back-up braking pressure and the changeover valve and being operable as a function of axle loading and backup braking pressure to regulate the supply of back-up braking pressure to the changeover valve.

During normal braking the changeover valve is actuated to connect the primary braking circuit to the braking actuator. When the primary braking circuit is defective, the changeover valve connects the back-up braking circuit to the braking actuator.

The provision of a regulating or apportioning valve located in the back-up braking circuit between the source of back-up braking pressure and the changeover valve provides a simple method of load apportioning into the braking system under back-up braking conditions.

In a preferred embodiment, the regulating or apportioning valve is actuated by air suspension pressure, which gives a signal which is representative of the axle load. The apportioning valve thus controls the application of braking pressure and restricts the application of braking pressure if the axle load is too low, either as a result of light loading or as a result of braking.

Alternatively, a mechanical linkage which varies in accordance with suspension height and axle loading may be used to operate the apportioning valve.

BRIEF DESCRIPTION OF THE DRAWINGS

By way of example only, a specific embodiment of the present invention will now be described, with reference to the accompanying drawings, in which:FIG.

DISCUSSION OF THE PREFERRED EMBODIMENT.

Figure 1:
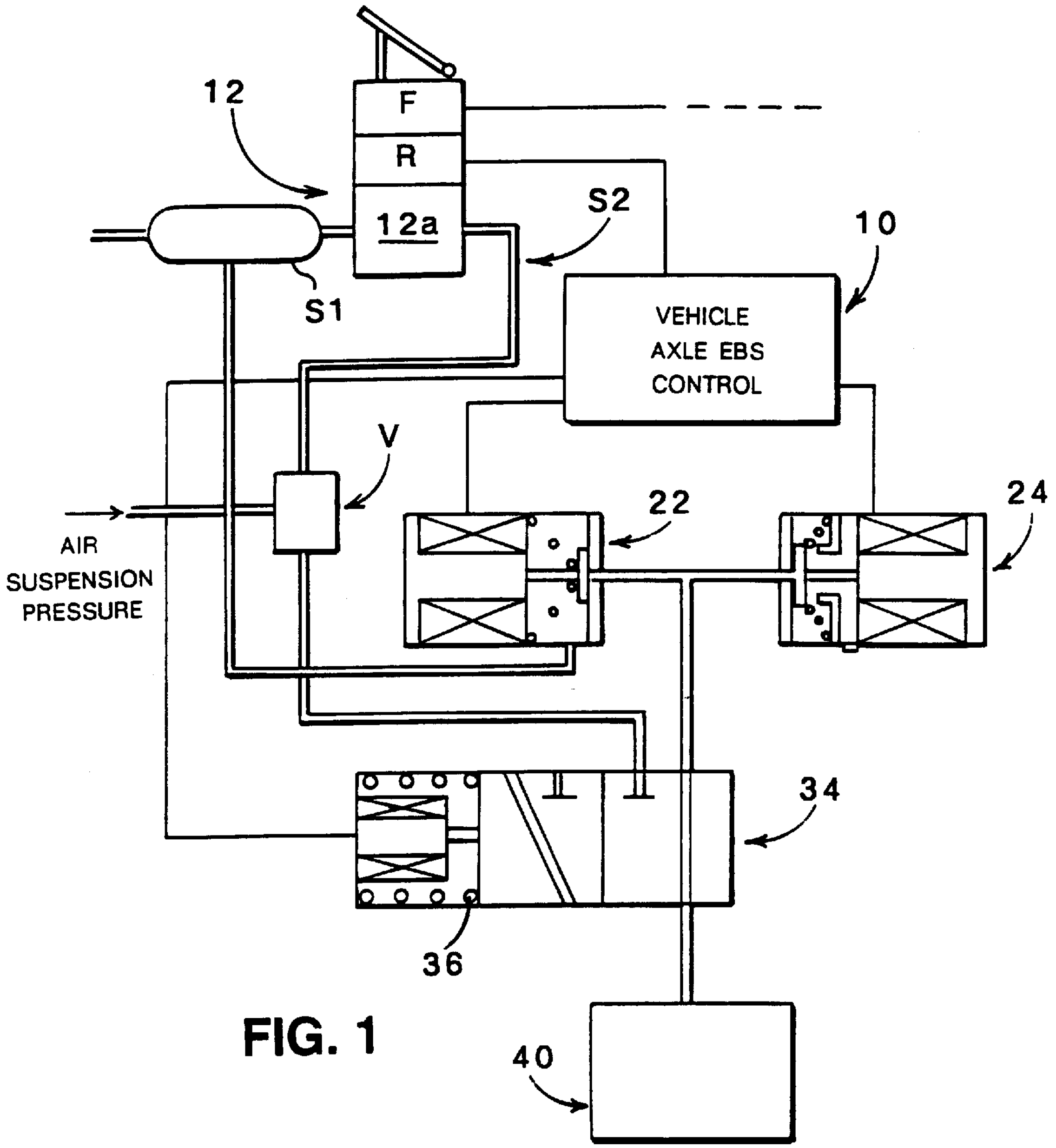
FIG. 1 is a diagrammatic illustration of a first embodiment of a rear axle vehicle braking system in accordance with the present invention.
Figure 2:
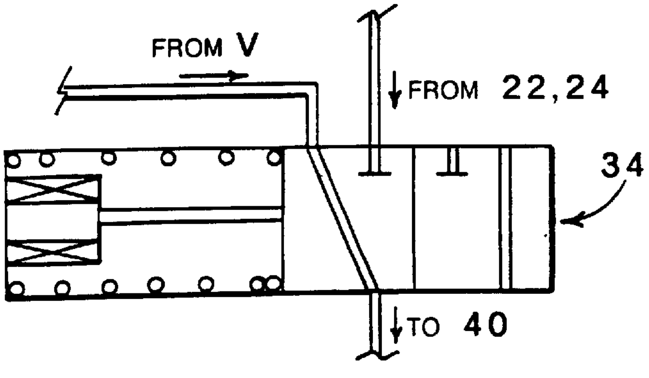
FIG. 2 is an illustration of a portion of the vehicle braking system of FIG. 1, showing the changeover valve when unactuated.

With reference to FIGS. 1 and 2, an electronic braking system (EBS) comprises an electronic braking control unit 10 which receives electrical braking demand signals from a brake pedal 12. The EBS brake pedal 12 provides electrical signals to the braking control unit 10 proportional to the deceleration demanded by the driver. By using suitable software within the control unit 10, the control unit is able to respond to those demands by controlling two solenoid valves 22, 24, illustrated schematically.

Valve 22 is a normally closed solenoid inlet valve and valve 24 is a normally opened solenoid exhaust valve, both under the control of the control unit 10 for applying and releasing the primary brake pressure S1 which is connected to inlet valve 22. The pedal 12 also operates an upright proportional valve 12*a* whenever it is depressed. The input of the proportional valve 12*a* is fed with pressurised fluid (usually air) from the primary source of primary braking S1 and the output of the proportional valve 12*a* thus forms a secondary source of braking pressure S2. The primary source of braking pressure (the output of valves 22 and 24) and the secondary source of braking pressure (the output from proportional valve 12*a*) are connected to respective inlet ports of a 3/2 (three port, two position) solenoid-operated changeover valve 34, which operation is under the control of the control unit 10.

For normal braking operation, wherever braking is demanded by depression of the pedal 12) the 3/2 valve 34 is energised by control unit 10 against the force of a restoring spring 36 (i.e. from the position shown in FIG. 2 to the position shown in FIG. 1) to hold open the passage between the control valves 22, 24 and a brake actuator 40 and to isolate the back-up (secondary) braking pressure from the actuator 40.

In the event of a system failure, the solenoid of the 3/2 valve 34 is not energised and the restoring spring 36 holds the 3/2 valve in its back-up position (illustrated in FIG. 2), thereby connecting the secondary source of pressure S2 to the brake actuator 40.

As indicated in FIG. 1, an apportioning valve V is located in the back-up braking system between the source of back-up braking pressure (the output of the proportional valve 12*a*) and the changeover valve 34. The apportioning valve V is illustrated in more detail in FIG. 3 and comprises a first stepped piston 50 and a second piston 52 slidably disposed within a common valve housing and aligned along a common axis X. Piston 50 is a stepped piston and is slidably disposed in a stepped bore having a first, wider portion 54 and a second, narrower portion 56 joined at an annular shoulder 58. The wider and narrower piston portions 54,56 are sealingly slidable in their respective bore portions by means of annular seals 60,62 disposed in annular grooves 64,66 in the piston.

One end A of piston 50 (the end remote from piston 52) thus has a larger surface (area A) than the area (area B) at an opposite end B and the larger end of piston 50 is acted upon by air suspension pressure (in the suspension on the axle to be braked) over surface area A of the piston against the force of, a restoring spring 68 extending between the opposite face of the enlarged head of the piston and the shoulder 58. The maximum displacement of piston 50 towards piston 52 is limited by a further shoulder 70 at the inner end of the narrower piston portion 56, against which the other end of the piston 50 can abut. This end of the piston also communicates continually with the changeover valve 34 via an outlet port 74 in the valve housing.

Piston 52 is provided with a resilient valve seal 76 which is a loose fit in a bore 78, such that a continuous radial clearance exists between the seal 76 and the bore 78. Piston 52 is biassed towards sealing engagement with a valve seat formed by the annular end of the bore 78 by a conical compression spring 80 and by back-up braking pressure applied from the proportional valve 12a. Piston 52 is guided longitudinally within the bore 78 by an elongate projection 82 which passes through a reduced diameter bore fluted neck portion 84 into a chamber 85 located between the shoulder 70 and the neck portion 84, while allowing air to flow through the neck portion 84 past the projection 82, via the fluted neck portion 84 (or via one or more axial drillings 84' within the diameter of the seal lip, as illustrated schematically in dotted lines in FIG. 3).

The outlet port 74 extends from the chamber 85 into which the piston 52 projects to the 3/2 solenoid changeover valve 34. The enlarged bore portion 54 which receives the first piston 50 is also provided with a vent port 86 so that the movement of piston 50 will not be restricted by compressed air in the chamber behind the enlarged portion.

Figure 3:
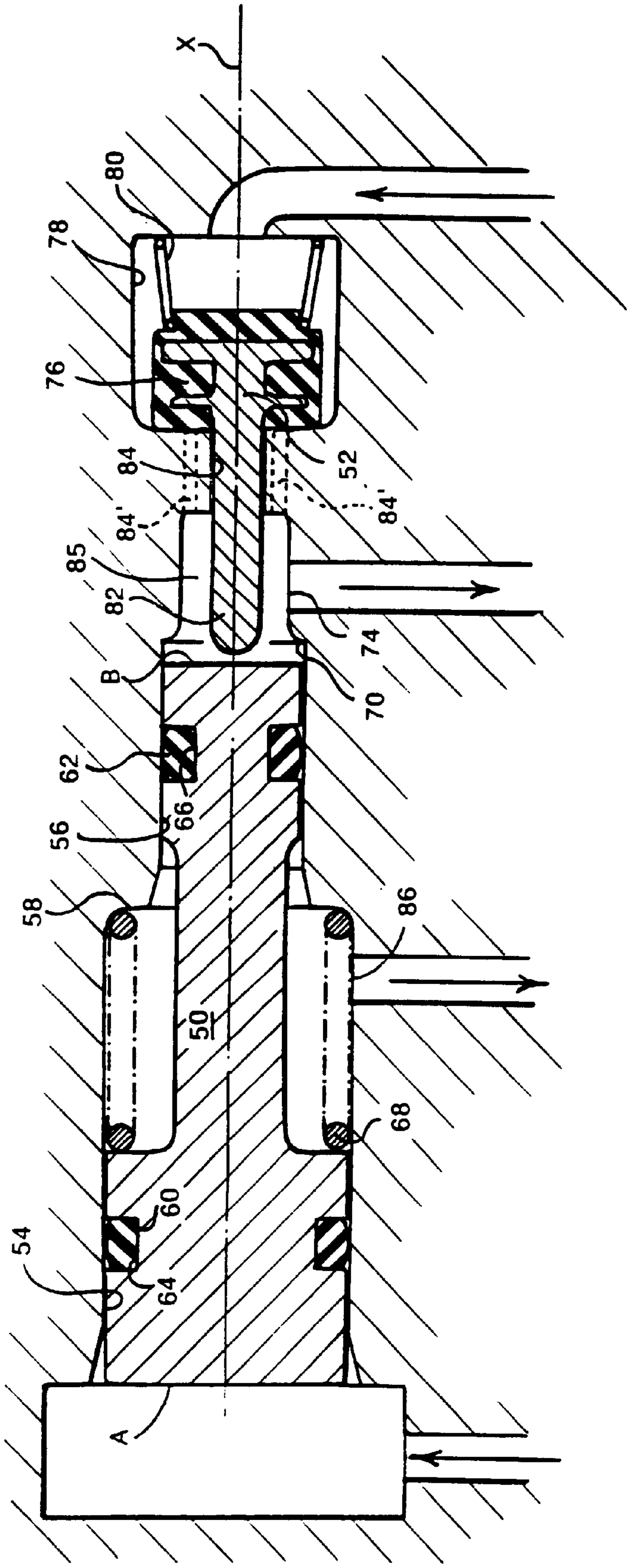
FIG. 3 is a cross-section through a first load apportioning valve forming part of the rear axle braking system of FIG. 1.

Air suspension pressure is continuously applied to area A of piston 50, thus urging the piston 50 to move forward, thereby compressing spring 68. As piston 50 continues to move forward against the restoring force of spring 58, it eventually contacts the projection 82 of piston 52, thereby displacing piston 52 to the right as illustrated in FIG. 3, lifting the valve seal 76 from its seat and enabling any secondary pressure applied to the rear face of piston 52 to be connected to port 74 (via the fluted neck portion 84 or axial drilling) 84 which is in turn connected to the changeover valve 34.

On application of the foot brake, pneumatic connection of the back-up braking pressure (i.e. the source S1 as modified by the proportional valve 12*a*) is fed into the apportioning valve V and air at back-up braking pressure is allowed to travel to the changeover valve 34 since the piston 52 is lifted from its seat. Once the piston 52 has been lifted from its seat, the back-up braking pressure also acts over the surface area (area B) of the smaller end of piston 50.

When (air suspension pressure x area A) is less than the force of spring 68 + (pressure fed to changeover valve 34×area B) then piston 50 moves backwards, causing piston 52 to follow under force from spring 80 until the neck portion 84 is shut-off by valve seal 76, at which point no further pressure rise can occur in the line connected to the changeover valve 34. Thus, any increase in secondary (back-up) braking pressure cannot be applied to the changeover valve 34 since the value of the air suspension pressure as compared with the back-up braking pressure results in closure of the valve. Thus, the maximum braking pressure is regulated as a function of axle load.

Spring 68 is provided to limit the operating pressure range of the valve which is useful when under low load conditions (for example less than half fully laden). In such circumstances the valve remains shutoff (air suspension pressure x area A is less than the force of spring A) to prevent any braking pressure from reaching the rear axle, as the lock point for the rear wheels is nearly always less than that for the front wheels even under very low levels of braking at low loads. Thus, the valve can be more accurately matched to requirements at higher load levels.

The areas of faces A and B and the spring characteristics can be adjusted to provide any required relationship for different vehicle parameters.

Figure 4:
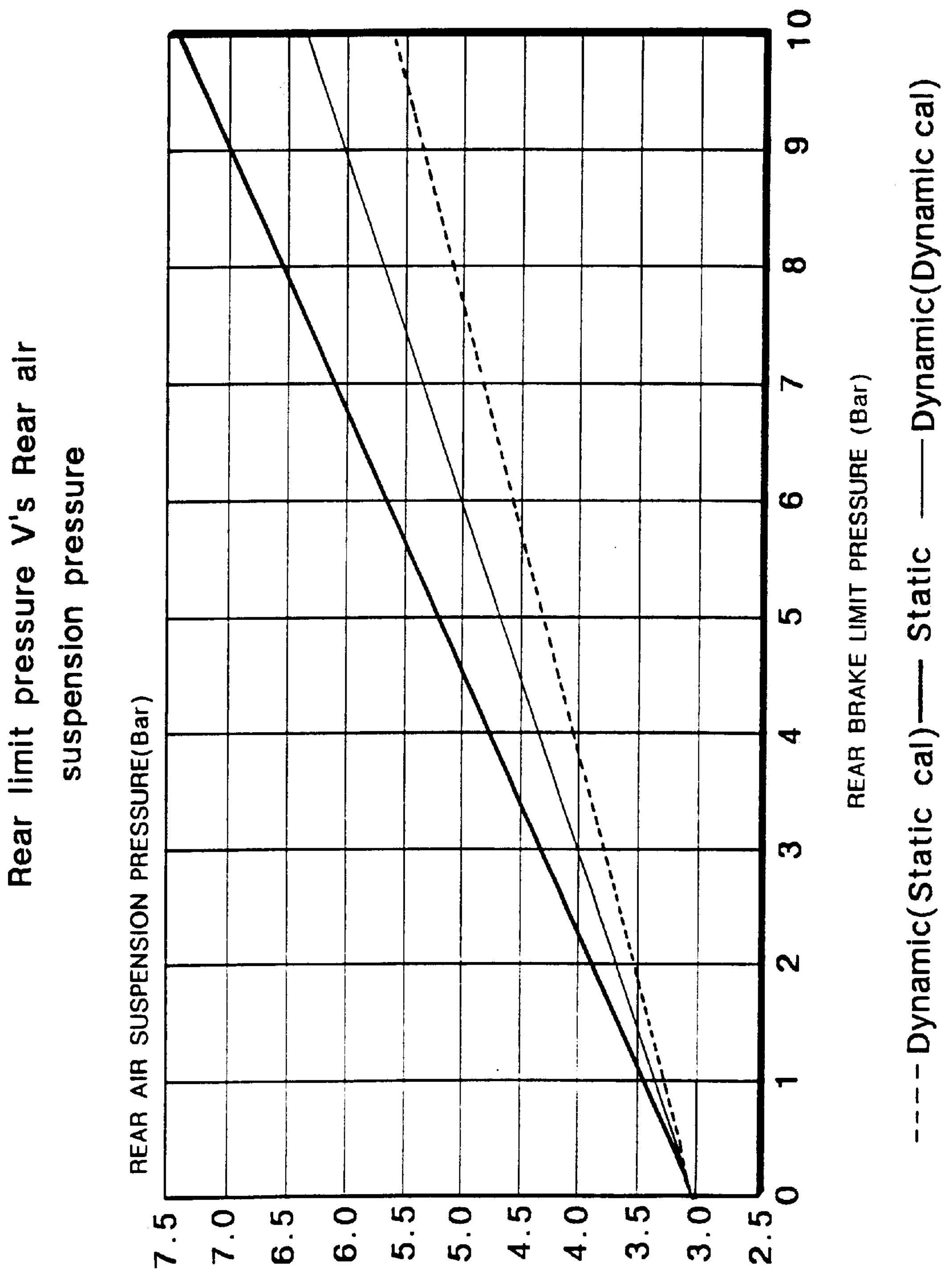
FIG. 4 is a graph showing an example of calculated valve performance prediction.

FIG. 4 shows an example of calculated valve performance prediction by plotting the rear air suspension pressure against the rear brake limit pressure during back-up braking and shows the calculated valve performance as a static function, a dynamic function (static calculation) and a dynamic function (dynamic calculation). It can be seen that, as the rear air suspension pressure diminishes, i.e. the load on the rear axle is reduced, the rear brake limit pressure (the pressure at which wheel locking occurs) also diminishes.

Figure 5:
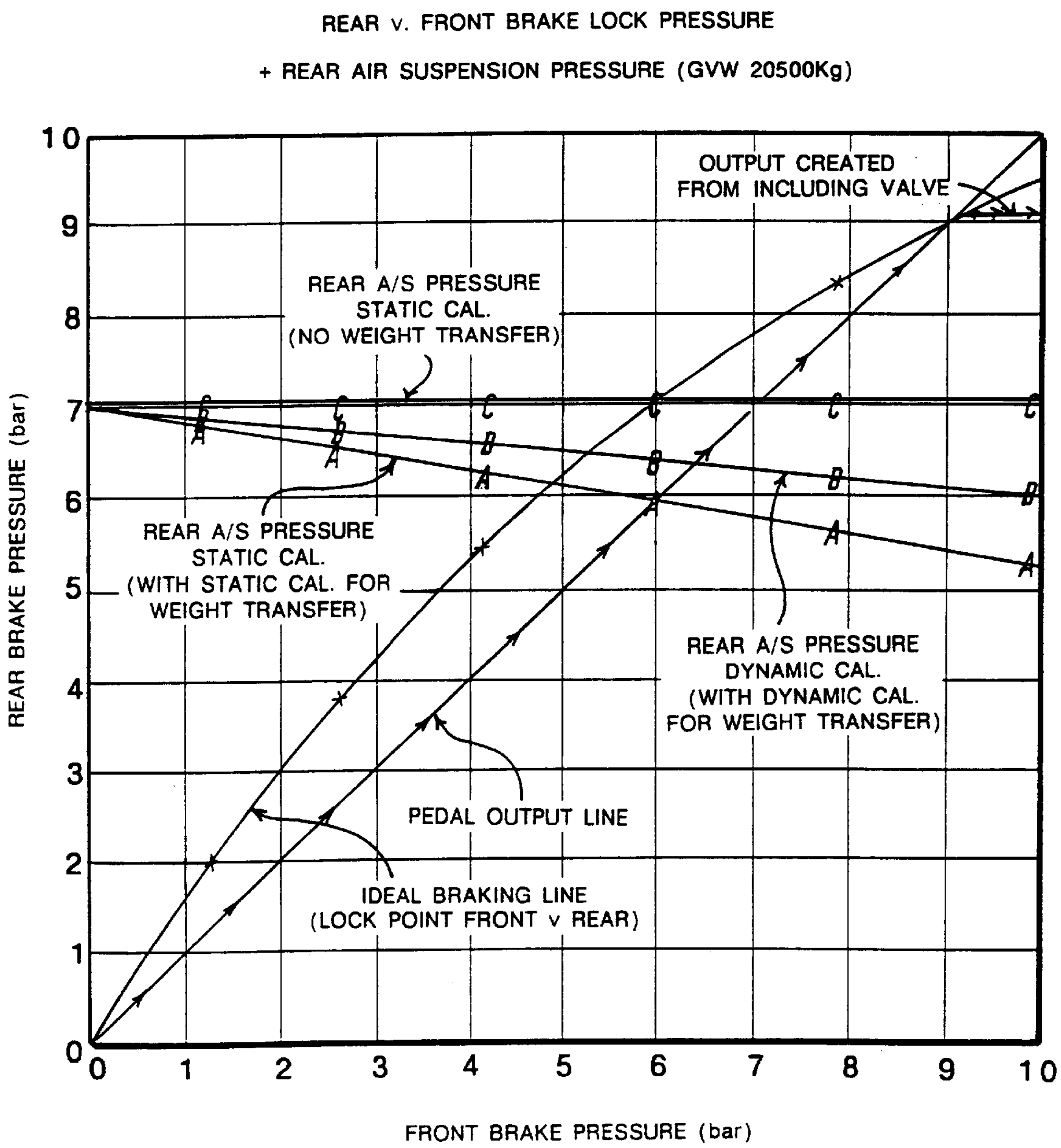
FIGS. 5 to 7 are graphs showing an example of vehicle performance prediction calculation relating to the operation of the valve illustrated in FIG. 2.
Figure 6:
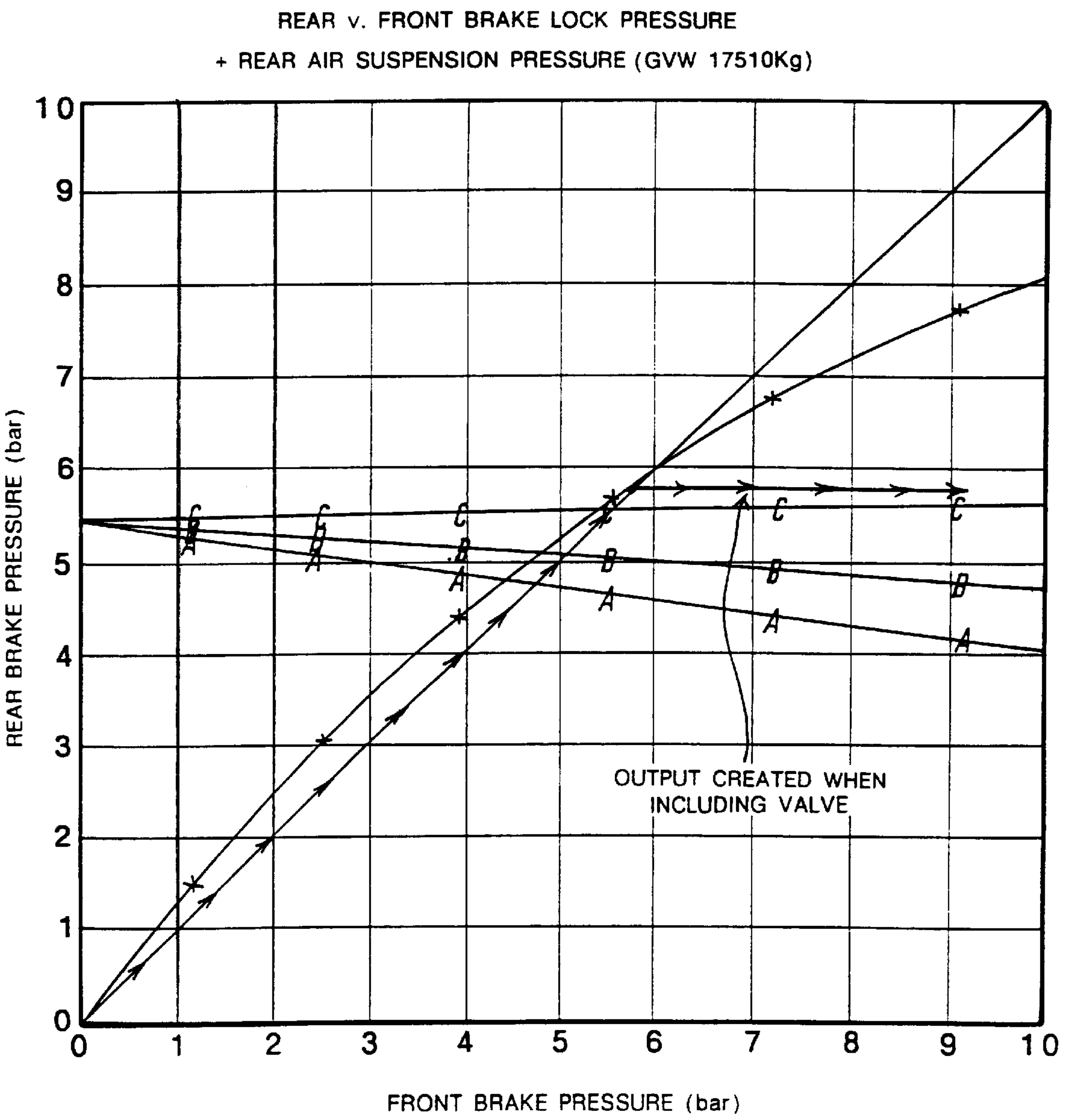
Figure 7:
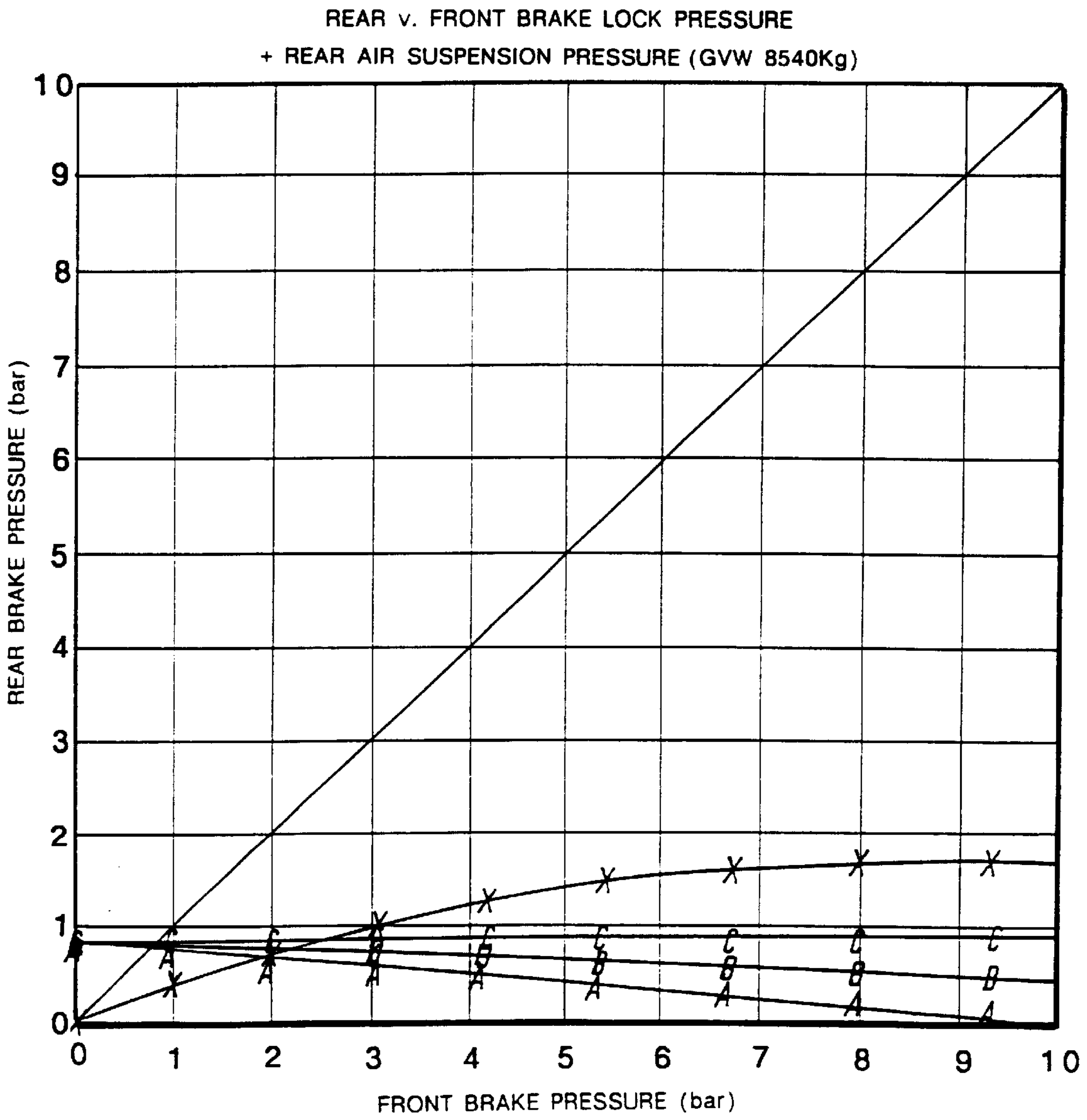

FIGS. 5 to 7 show an example of vehicle performance calculation in a braking system to which the valve of FIG. 3 is fitted. In each case, the graph shows the relationship between rear air suspension pressure and front braking pressure for three scenarios as follows:

A: the rear air suspension pressure as a static calculation (with a static calculation for weight transfer during braking) i.e. based on the (incorrect) assumption that air suspension pressures follow the dynamic load changes;

B: rear air suspension pressure as a dynamic calculation (with a dynamic calculation for weight transfer), i.e. recognising that the actual loads under weight transfer conditions are transient to which pressure changes do not fully respond;

C: rear air suspension pressure as a static calculation (with no correction for weight transfer), i.e. a simple calculation which does not recognise dynamic load shift.

In addition, the FIGS. 5–7 show the relationship between front brake pressure and rear brake pressure for ideal braking and the braking achieved in practice using the embodiment of FIGS. 1 and 2.

Referring firstly to FIG. 5, this illustrates the situation where the gross vehicle weight is approximately 20,500 kg. The relationship between front and rear braking pressure is essentially linear until the front and rear braking pressure is approximately 9.1 bar, whereupon the rear braking pressure cannot be increased beyond this value. Any increase in braking demanded at the brake pedal 12 can result in a higher braking pressure applied to the front wheels but cannot result in any additional brake pressure being applied to the rear wheels. In this case, the following inequality applies:

(air suspension pressure x area A) −(force of spring 68)<(back-up braking pressure) x (area of valve 52+area B)+(force of spring 80)

In other words, the back-up braking pressure applied to piston 52 is sufficient to engage the piston with its valve seat, thereby cutting off the source of back-up braking pressure to the changeover valve 34.

FIG. 6 illustrates the situation in which the gross vehicle weight is 17,510 kg. In such a situation, the rear wheels are even more prone to locking and it will be noted that above a back-up braking pressure of approximately 5.75 bar, no additional braking pressure is applied to the rear brakes, whereas a higher pressure can still be applied to the front brakes.

It will be noted from FIG. 4 that below a rear air suspension pressure of approximately 3.1 bar, any braking pressure applied to the rear brakes is likely to result in locking of the wheels. Thus, in FIG. 7, which illustrates the situation for a gross vehicle weight of 8,540 kg, it will be noted that no braking pressure is applied to the rear brakes at all.

Figure 8:
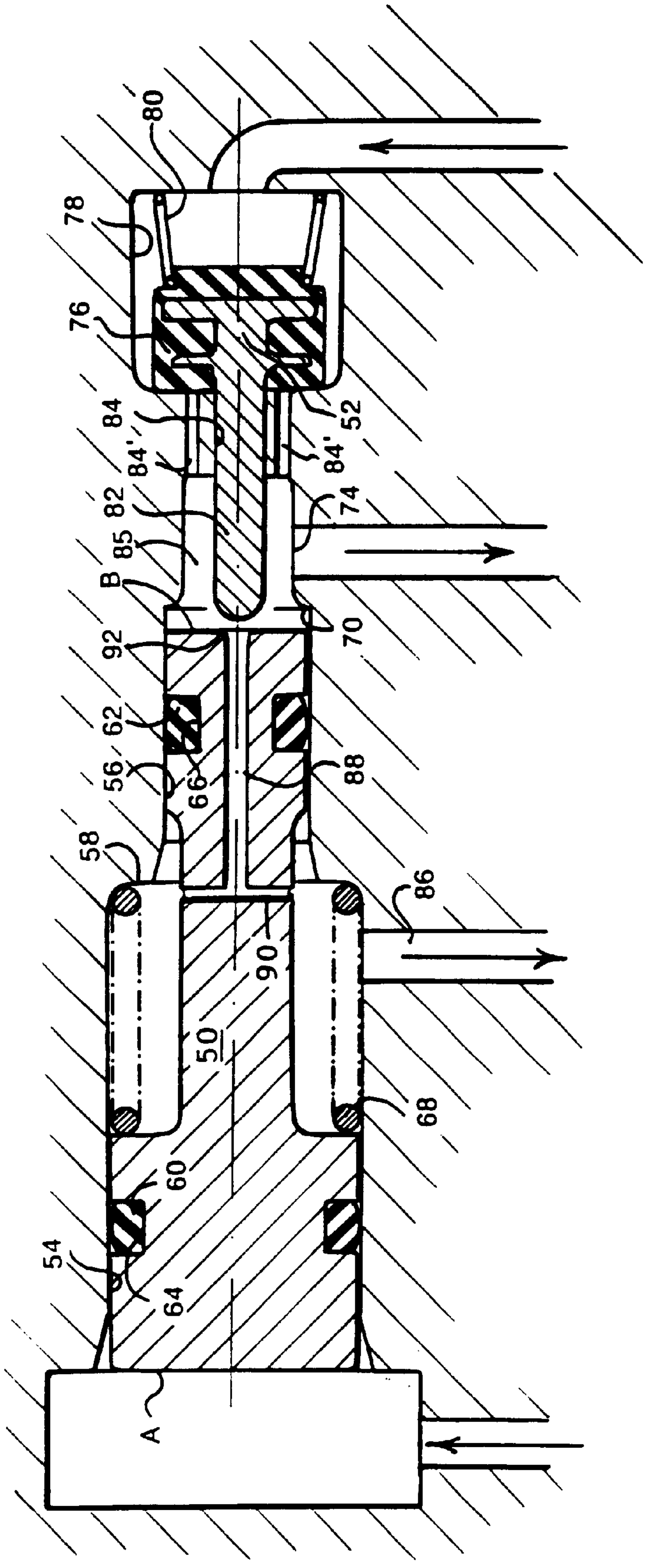
FIG. 8 is a cross-section through a modified load apportioning valve forming part of the rear axle braking system of FIG. 1.

FIG. 8 illustrates a modified version of the apportioning valve of FIG. 3. Many features of the modified valve are the same as those of FIG. 3 and the same reference numerals have been used for like features.

The most significant modification is the provision of an axial bore 88 in piston 50, whose inner end connects with a transversely extending through bore 90 and whose outer end is formed into a valve seat 92 which is sealingly engageable with the free end of the projection 82 of piston 52 to form a valve which is closed when the two pistons 50,52 are forced together by pressures acting on the opposite ends. The bores 88 and 90 lead to the vent port 86 and allow the brake pressure to fall if the pistons 50,52 become separated by spring 68 once the main valve seat on piston 52 is closed. The advantage of this provision is to allow the pressure trapped in the brake (and port 74) to fall if the axle loading reduces, which may occur when the vehicle deceleration and weight transfer build up. The modified valve counters any rear axle pressure overshoot caused by a fast application of braking demand when in the pneumatic back-up mode.

Figure 9:
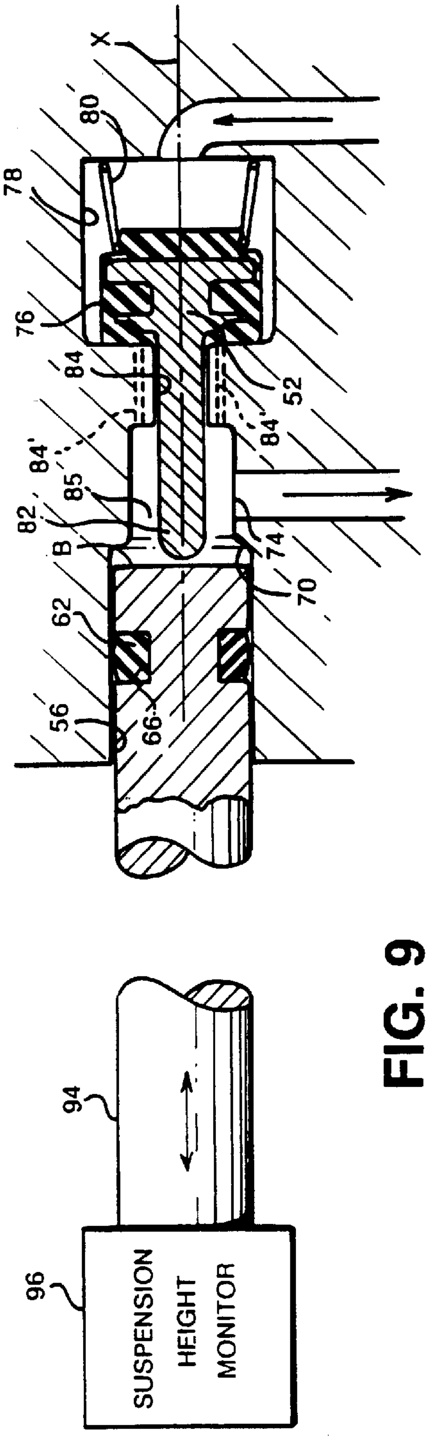
FIG. 9 is a diagrammatic illustration of a second embodiment of rear axle braking system in accordance with the present invention.

FIG. 9 illustrates an arrangement in which the air suspension pressure acting on face A of piston 50 in FIG. 3 is replaced with a mechanical linkage 94 extending from a suspension height monitor 96, the loading of the mechanical link 94 being proportional to the suspension height and therefore axle loading.

Figure 10:
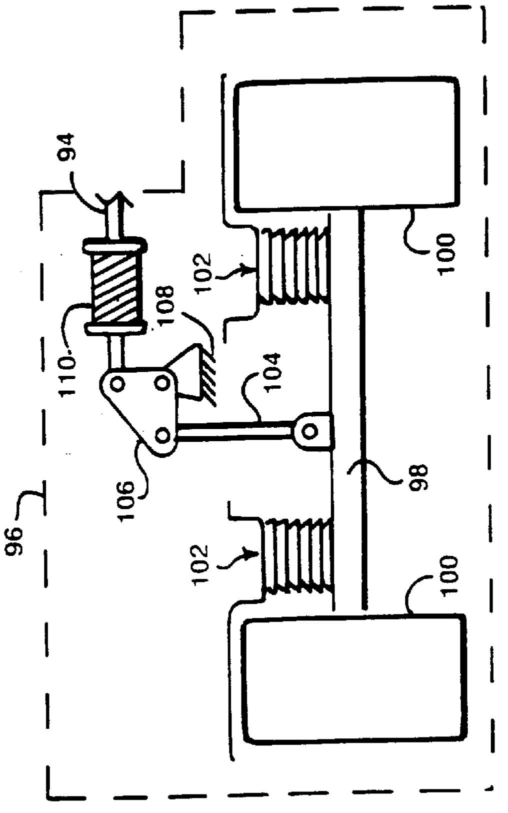
FIG. 10 is a diagrammatic illustration of a suspension height monitor which can be used with the embodiment of FIG. 2.

FIG. 10 illustrates a generally conventional mechanical linkage which is suitable for use as the suspension height monitor 96 of FIG. 9. The monitor effectively measures the loading of an axle 98 having a wheel 100 at each end and a suspension system 102. The lower end of a rod 104 is pivotally mounted to the axle 98 and the upper end is pivotally mounted to one arm of a bell crank lever 106 which is itself pivotally mounted on the vehicle body 108. The other arm of the bell crank lever 106 is pivotally connected to one end of a compression spring 110, the opposite end of which is connected to the mechanical linkage 94 of FIG. 9. As the movement of the axle 98 increases (in response to load and/or disturbances),the compression of the spring 110 increases, thus producing a corresponding increase in force applied to the linkage 94. A higher axle loading causes the mechanical linkage 94 to be loaded towards the right in FIG. 9 and conversely a lower axle loading causes a lower loading to the right. The operation of this embodiment is otherwise identical to that of the FIG. 3 embodiment, with references to the forces resulting from air suspension pressure being replaced with references to forces from the mechanical linkage 94. This modification is also applicable to the embodiment of FIG. 8.

What is claimed is:

1. A braking system for a road vehicle, comprising:

a primary electronic braking circuit;

a back-up braking circuit having a source of back-up braking pressure which varies in accordance with braking demand as initiated by a driver;

a braking actuator for braking a wheel on a vehicle axle;

a changeover valve which is biased into a back-up position in which the back-up braking circuit is connected to the braking actuator and is actuable to a normal braking position during correct operation of the braking system to apply the primary electronic braking circuit to the braking actuator; and a regulating valve located in the back-up braking circuit between the source of back-up braking pressure and the changeover valve and being operable as a function of axle loading and back-up braking pressure to regulate the supply of back-up braking pressure to the changeover valve.

2. A braking system as claimed in claim 1, wherein air suspension pressure in an axle of a wheel to be braked is utilised as a measure of axle loading.

3. A braking system as claimed in claim 2, wherein the regulating valve comprises a first piston having a first end acted upon by air suspension pressure in an axle of a wheel to be braked and displaceable in a first direction against the force of a restoring spring and a second piston which is urged into sealing engagement with an associated valve seat by a spring and back-up braking pressure generated during braking, the first piston being displaceable in the first direction to engage a second end with the second piston and displace it from its valve seat and thereby apply the back-up braking pressure to the changeover valve and to the second end of the first piston.

4. A braking system as claimed in claim 1, wherein the regulating valve comprises a first piston having a first end acted upon by air suspension pressure in an axle of a wheel to be braked and displaceable in a first direction against the force of a restoring spring and a second piston which is urged into sealing engagement with an associated valve seat by a spring and back-up braking pressure generated during braking, the first piston being displaceable in the first direction to engage a second end with the second piston and displace it from its valve seat and thereby apply the back-up braking pressure to the changeover valve and to the second end of the first piston.

5. A braking system as claimed in claim 4, wherein the surface area of the first end of the first piston is larger than the surface area of the second end of the first piston.

6. A braking system as claimed in claim 4, wherein the second piston is provided with a guide to ensure longitudinal movement of the second piston and the regulating valve comprises a passage to ensure a supply of back-up braking pressure when the second piston is lifted from its seat.

7. A braking system as claimed in claim 5, wherein the second piston is provided with a guide to ensure longitudinal movement of the second piston and the regulating valve comprises a passage to ensure a supply of back-up braking pressure when the second piston is lifted from its seat.

8. A braking system as claimed in claim 4, wherein the regulating valve further comprises a vent port, the second end of the first piston is formed into an additional valve seat which is sealingly engageable with an end of the second piston and the first piston further comprises a bore connecting the additional valve seat to the vent port.

9. A braking system as claimed in claim 5, wherein the regulating valve further comprises a vent port, the second end of the first piston is formed into an additional valve seat which is sealingly engageable with an end of the second piston and the first piston further comprises a bore connecting the additional valve seat to the vent port.

10. A braking system as claimed in claim 6, wherein the regulating valve further comprises a vent port, the second end of the first piston is formed into an additional valve seat which is sealingly engageable with an end of the second piston and the first piston further comprises a bore connecting the additional valve seat to the vent port.

11. A braking system as claimed in claim 1, wherein the braking actuator controls the braking of a rear wheel of the vehicle.

12. A braking system as claimed in claims 1, wherein the braking actuator controls the braking of a trailer wheel.

13. A braking system as claimed in claim 1, wherein air suspension pressure in an axle of a wheel to be braked is utilized as a measure of axle loading.

14. A braking system as claimed in claim 1, wherein the regulating valve comprises a first piston having a first end acted upon by air suspension pressure in an axle of a wheel to be braked and displaceable in a first direction against the force of a restoring spring and a second piston which is urged into sealing engagement with an associated valve seat by a spring and back-up braking pressure generated during braking, the first piston being displaceable in the first direction to engage a second end with the second piston and displace it from its valve seat and thereby apply the back-up braking pressure to the changeover valve and to the second end of the first piston.

15. A braking system as claimed in claim 1, further comprising a device to monitor suspension height, the output of which is utilised as a measure of axle loading.

16. A braking system as claimed in claim 15, wherein the mechanical output from a suspension height detector is utilised as a measure of axle loading.

17. A braking system as claimed in claim 1, wherein the braking actuator controls the braking of a rear wheel of the vehicle.

18. A braking system for a vehicle comprising:

a primary electronic braking circuit;

a back-up braking circuit having a source of back-up braking pressure;

a braking actuator for braking a wheel on a vehicle axle; and a changeover valve which selectively applies one of the primary and back-up braking pressures to the braking actuator during braking;

characterised by a regulating valve located in the back-up braking circuit between the source of back-up braking pressure and the changeover valve and being operable as a function of axle loading and back-up braking pressure to regulate the supply of back-up braking pressure to the changeover valve;

wherein the regulating valve comprises a first piston having a first end acted upon by air suspension pressure in an axle of a wheel to be braked and displaceable in a first direction against the force of a restoring spring and a second piston which is urged into sealing engagement with an associated valve seat by a spring and back-up braking pressure generated during braking, the first piston being displaceable in the first direction to engage a second end with the second piston and displace it from its valve seat and thereby apply the back-up braking pressure to the changeover valve and to the second end of the first piston;

wherein the second piston is provided with a guide to ensure longitudinal movement of the second piston and the regulating valve comprises a passage to ensure a supply of back-up braking pressure when the second piston is lifted from its seat; and wherein the guide comprises a projection inserted in a reduced diameter neck portion radially inwardly of the angular valve seat.

19. A braking system as claimed in claim 18, wherein the regulating valve further comprises a vent port, the second end of the first piston is formed into an additional valve seat which is sealingly engageable with an end of the second piston and the first piston further comprises a bore connecting the additional valve seat to the vent port.

* * * * *

UNITED STATES PATENT AND TRADEMARK OFFICE

CERTIFICATE OF CORRECTION

PATENT NO. : 6,540,307 B1
DATED : April 1, 2003
INVENTOR(S) : Ward et al.

It is certified that error appears in the above-identified patent and that said Letters Patent is hereby corrected as shown below:

Title page,
Item [45] and Item [*] Notice, should read as follows:

-- [45] **Date of Patent: *Apr. 1, 2003**

[*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 206 days. --

Signed and Sealed this

Fifth Day of August, 2003

JAMES E. ROGAN
*Director of the United States Patent and Trademark Office*